United States Patent [19]
Jansen et al.

[11] Patent Number: 5,454,862
[45] Date of Patent: Oct. 3, 1995

[54] PROCESS FOR PREPARING A HOT-MELT ADHESIVE COMPOSITION, A HOT-MELT ADHESIVE COMPOSITION AND ARTICLES MADE BY USING THE SAME

[75] Inventors: Johannes J. Jansen, Veendam; Uko Veen, Muntendam; Johan Legters, Hoogezand, all of Netherlands

[73] Assignee: Cooperatieve Verkoop-En Productievereneniging, Veendam, Netherlands

[21] Appl. No.: 218,949

[22] Filed: Mar. 29, 1994

[51] Int. Cl.⁶ .................. C08L 3/04; C08L 3/10; C08L 3/02
[52] U.S. Cl. .................. 106/213; 106/210
[58] Field of Search .................. 106/210, 211, 106/212, 213, 214

[56] References Cited

U.S. PATENT DOCUMENTS

| | | | |
|---|---|---|---|
| 2,215,846 | 9/1940 | Bauer | 106/210 |
| 2,378,378 | 6/1945 | Bauer | 106/210 |
| 3,351,480 | 11/1967 | Mentzer | 106/210 |
| 3,725,324 | 4/1973 | Cummisford | 106/210 |
| 4,131,581 | 12/1978 | Coker | 524/47 |
| 4,155,884 | 5/1979 | Hughes | 106/210 |
| 4,157,318 | 6/1979 | Sadle et al. | 106/213 |
| 4,804,414 | 2/1989 | Gleason | 106/212 |
| 5,316,578 | 5/1994 | Buehler et al. | 106/210 |

FOREIGN PATENT DOCUMENTS

| | | |
|---|---|---|
| 94200291 | 10/1994 | European Pat. Off. . |
| 1426378 | 12/1965 | France . |
| 4000241 | 7/1991 | Germany . |

*Primary Examiner*—Peter A. Szekely
*Attorney, Agent, or Firm*—Hoffmann & Baron

[57] ABSTRACT

It has been found that a hot-melt adhesive composition can be prepared by mixing a starch product, urea and optionally water are mixed with each other to obtain a homogeneous composition, the starch product/urea weight ratio being selected within the range of 3/1–3/97 and the amount of water present being 3–20 wt. %, based on the amount of starch product +urea, and which mixing may or may not be carried out with heating, but an oxidative treatment is omitted. Moreover, a hot-melt adhesive composition has been found which essentially comprises the above components in the above weight ratio and amount. The composition obtained according to the invention is solid at room temperature but becomes fluid at elevated temperature and can particularly be used in the manufacture of packagings and nonwoven articles.

13 Claims, No Drawings

PROCESS FOR PREPARING A HOT-MELT ADHESIVE COMPOSITION, A HOT-MELT ADHESIVE COMPOSITION AND ARTICLES MADE BY USING THE SAME

This invention relates to a process for preparing a starch-containing hot-melt adhesive. As referred to herein, hot-melt adhesives are adhesive compositions which, at room temperature, are in a solid state (in the form of powder, granulate, blocks, cartridges, etc.), become fluid at elevated temperature, can be applied as a fluid product to or between substrates and become solid again on cooling to form solid compounds.

Hot-melt adhesives are used in many branches of industry, in particular in the manufacture of packagings and nonwoven articles. The hitherto used hot-melt adhesives often consist of components that are hardly biodegradable. This causes additional environmental problems in the waste treatment of packagings and non-woven articles. Furthermore, when reusing (recycling) packaging materials, problems arise owing to the presence of water-insoluble hot-melt adhesive remainders.

The use of starch products in solid compositions which become fluid by the influence of heat and pressure is known from the literature. GB-A 964 799 discloses such compositions. It relates to the use of starch ethers and starch esters in compositions used in the manufacture of shaped articles and for applying coating layers to substrates. As plasticizer for the starch derivative, particularly glycols and polyols, such as propylene glycol and glycerol are used.

According to DE-A 2 521 890 a meltable paper glue on the basis of cellulose is made by treating a combination of carboxymethyl cellulose and urea with hydrogen peroxide and iron(II) chloride under certain conditions. Besides these components, the reaction mixture may also contain starch. The process used is laborious, so that the adhesive obtained is relatively expensive.

FR-A 2 675 811 discloses a hot-melt adhesive composition containing at least 40 wt. % of a starch product and at least one so-called texturing agent in an amount of at least 30% relative to the water present. According to the examples the texturing agents used are always mixtures which contain as essential components sodium lactate, urea and sorbitol, and which, in addition, may contain glycerol or calcium stearate. Sorbitol is always present in an amount substantially larger than the amount of all the other components together. The composition of these known hot-melt adhesives is rather complicated, and it is important to determine for each of them the correct mutual ratio of the different components. This makes the manufacture laborious and expensive, the latter also because of the co-use of components, such as lactates, sorbitol and glycerol.

U.S. Pat. No. 2,215,846 discloses adhesive compositions on the basis of gelatinized starch and urea which is present in an amount of 25–50%, based on the total weight of starch and urea. The amount of water is 25–75%, also based on the total weight of starch and urea.

U.S. Pat. No. 3,725,324 discloses the step of combining urea with a gelatinized amylaceous material using water in an amount less than 20 percent of the total mix, and subsequently heating the mixture to obtain a binder for use in a drywall finishing compound. The amount of urea is at most 20% based on the weight of the amylaceous material.

Finally, FR-A 1 426 378 discloses a liquid adhesive composition comprising a carbohydrate, e.g. starch, urea and water. Urea is present in an amount of 5–50% by weight, and according to the examples the amount of water is between 22.6 and 69.6% by weight of the total composition.

The hot-melt adhesives on the basis of synthetic components hitherto used are water-insoluble and poorly biodegradable. Meltable paper glues known from the literature that are completely or partly water-soluble and biodegradable are made by laborious processes and with rather expensive ingredients, so that production costs are high. These paper glues have hitherto not made on an industrial scale.

It is an object of this invention to prepare hot-melt adhesive compositions in a simple, reliable and inexpensive manner, by means of inexpensive raw materials, and which not only excel in their desired effect, but are also properly soluble in water and highly biodegradable.

It is another object of the invention to provide a hot-melt adhesive composition that can be easily and efficiently processed because of its sufficiently low melting temperature and its proper flowability in the molten state, and further because it contains only a small amount of water, in consequence of which the swelling of the starch product remains restricted and a rapid drying is obtained without risking shrinkage cracks.

According to the invention these objects are achieved by preparing a hot-melt adhesive composition in such a manner that a starch product, urea and optionally water are mixed with each other to obtain a homogeneous composition, the starch product/urea weight ratio being selected within the range of 3/1–3/97 and the amount of water present being 3–20 wt. %, based on the amount of starch product + urea, and which mixing my or may not be carried out with heating, but an oxidative treatment is omitted.

Accordingly, when preparing the present hot-melt adhesive composition, which is a solid at room temperature, no complicated treatments are carried out and only the relatively inexpensive urea needs to be used as the only auxiliary agent. For the present composition actually consists only of starch product, urea and water, besides which it contains no cellulose ethers, such as carboxymethyl cellulose, no salts of hydroxycarboxylic acids, such as sodium lactate, and no hydrogenated sugars, such as sorbitol.

Therefore, this invention also relates to a hot-melt adhesive composition which essentially comprises a starch product, urea and water, the starch product/urea weight ratio being within the range of 3/1–3/97, and the amount of water present being 3–20 wt. %, based on the amount of starch product + urea.

Surprisingly, it has actually been found that urea suffices as the only auxiliary agent, provided the amount used is large enough, as appears from the above weight ratio. For according to the invention the amount of urea must be at least ⅓ of the amount of starch product, while the largest amount of urea referred to in the above FR-A is only about ⅛, likewise related to the amount of starch product.

This invention is further distinguished by the presence of only a relatively small amount of water. The amount of water is always smaller than the amount of urea, while according to the above examples of FR-A 2 675 811 an excess of water is always present relative to the texturing agent which, as stated before, consists of a mixture of components, including urea. The presence of only a relatively small amount of water in the present hot-melt adhesive composition results in the above-indicated favourable effects of restricted swelling and rapid drying without shrinkage cracks.

According to a preferred embodiment of the invention the starch product/urea weight ratio is selected within the range of 7/4–3/7, and according to another preferred embodiment an excess of urea is present and the urea/starch product weight ratio is always at least 1.1 within the above ranges.

The starch product to be used according to the invention can be native or modified starch. The native starch can be isolated from different agricultural products. Examples of suitable starch types are potato starch (having an amylopectin content of 25–100 wt. % on dry solids), maize starch, tapioca starch, wheat starch, waxy maize starch, rice starch, sago starch and high-amylose starch. The modified starch can be obtained by physical, chemical and/or enzymatic modification of native starch. Physically modified starch can be obtained, e.g., by treatment of starch in extruders. Chemically modified starch products can be manufactured from native starch by acid hydrolysis, dextrination, oxidation, esterification, etherification, graft polymerization and/or crosslinking. Enzymatically modified starch can be manufactured by partial depolymerization of starch by means of amylases. It is also possible to use as starch product mixtures (native with modified starch or two types of modified starch). If hot-melt adhesives are to be composed having a relatively high starch content, starch products that have been partially depolymerized, e.g. by oxidation, enzymes or acid hydrolysis, may be advantageously used.

An essential component of the hot-melt adhesives according to the invention is urea (melting point 130° C.). The amount of water in the hot-melt adhesives is so low that the hot-melt adhesive composition can normally be made and processed in the air-dried state.

The hot-melt adhesive compositions may be manufactured according to the invention by mixing the air-dried components (starch product, urea and optionally additives) to obtain a homogeneous mixture. Air-dried starch products have an equilibrium moisture content dependent on the nature of the starch product, the temperature and the air humidity. The equilibrium moisture content of air-dried starch products usually ranges from 5 to 25 wt. %. This equilibrium moisture content of the starch product is often sufficient to impart the hot-melt adhesive composition the desired moisture content which, as stated before, ranges from 3 to 20 wt. %, based on the essential solid components of the hot-melt composition, namely the starch product and urea. If desired, the moisture content of the starch product may be decreased or increased before mixing with urea to give the hot-melt adhesive composition the desired moisture content. The desired moisture content of the composition may also be obtained by separately adding water to the mixture. The mixing process may be carried out in any suitable mixing apparatus. By heating the mixture at 90°–150° C., a fluid glue is obtained. The molten glue thus obtained can be used or further processed as follows:

a) The hot melt is immediately used as adhesive, b) Of the hot melt cartridges are cast by pouring the glue into moulds of the desired shape. The cooled, solidified cartridges removed from the moulds can be used in melt guns and the like. By means of these devices the solid cartridges can be melted again at any desired moment, after which the hot melt may be used for adhesive purposes.

c) The molten glue is granulated after cooling and solidification. Before use the granulate is melted in apparatuses suitable for this purpose.

The hot-melt adhesive composition according to the invention has a melting point preferably ranging from 90° to 150° C. and most preferably from 100° to 140° C. The relatively low melting temperature of the hot-melt adhesives according to the invention is advantageous over the hot-melt adhesives on the basis of synthetic polymers which usually have a melting point above 130° C. After melting the hot-melt adhesives according to the invention pass into a fluid mass having a viscosity preferably ranging from 200 to 50,000 mPa.s and most preferably from 1000 to 20,000 mPa.s, measured at 120° C. with a Brookfield, Model RVDV-III, Thermosel, at 20 rpm and the prescribed spindle (27 or 29).

Besides the above components, the hot-melt adhesive compositions according to the invention may further contain, if desired, small amounts of different additives, such as fillers, plasticizers, pigments, natural or synthetic resins, waxy compounds and lubricants.

The hot-melt adhesives may be used for different adhesive purposes, such as in the manufacture of nonwoven articles and packaging material, for closing boxes and bags, for laminating strengthened paper and in the manufacture of folding boxes.

This invention will be illustrated by the following examples. In these examples, % (percent) always means percentage by weight. The viscosities of the hot melts mentioned in the examples have been determined at 120° C. by means of a Brookfield, Thermosel, RVDV-III, 20 rpm, spindle 27, unless otherwise stated (LE/SW 47).

EXAMPLE 1

In this example the starch product used was an oxidized potato starch having a carboxyl content corresponding to a degree of substitution (DS) of 0.058. Ten grams of this oxidized potato starch (moisture content 17%) were mixed with 10 g urea. The resulting composition contained 41.5 parts by weight of starch, 50 parts by weight of urea and 8.5 parts by weight of moisture. This composition was then heated to 130° C. with regular agitation. From 110° C., the mass became plastic and then fluid. At 130° C., the resulting fluid hot melt had a viscosity of 2500 mPa.s at 130° C.

The glue thus obtained was applied as a thin film to kraft paper (glue applied: 40 g/m$^2$).

Disposed thereon, while re-heating, was a second layer of paper which was pressed on at a pressure of 40 g/m$^2$. Heating was effected at 170° C. for 5, 10 or 30 seconds. The bonding properties were determined by means of a Fipago testing device (type Fipago Klebkraftprüfgerät System PKL). The results are listed in Table 1. These results show that very strong bonding (complete fibrillation) has rapidly occurred. When urea was replaced by an equal amount of glycerol or propylene glycol, it appeared that no or only little bonding occurred (low degree of fibrillation), as also shown in Table 1.

TABLE 1

| Bonding of hot melts measured with a Fipago testing device | | | | |
|---|---|---|---|---|
| Heating time (s)[a] | Cooling time (s)[b] | Component in composition | | |
| | | Urea | Propylene glycol | Glycerol |
| 5 | 0 | 39 (100)[c] | 1 (0)[c] | 4 (5)[c] |
|  | 5 | 40 (100) | 0 (0) | 3 (5) |
|  | 30 | 51 (100) | 0 (0) | 0 (0) |
| 10 | 0 | 48 (100) | 3 (5) | 6 (15) |
|  | 5 | 35 (100) | 2 (5) | 4 (10) |
|  | 30 | 50 (100) | 1 (0) | 1 (1) |
| 30 | 0 | 28 (100) | 0 (0) | 3 (10) |
|  | 5 | 35 (100) | 0 (0) | 3 (10) |
|  | 30 | 38 (100) | 2 (1) | 2 (5) |

[a] Temperature 170° C.; pressure 40 g/m$^2$.

TABLE 1-continued

Bonding of hot melts measured with a Fipago testing device

| Heating time | Cooling time | Component in composition | | |
|---|---|---|---|---|
| (s)[a] | (s)[b] | Urea | Propylene glycol | Glycerol |

[b] Time between pressing on and pulling apart.
[c] Bonding in c$^J$ (centijoule) with bracketed percentage of fibrillation.

EXAMPLE 2

In the same manner as described in Example 1, different hot melts were prepared with varying moisture contents and contents of oxidized starch. The moisture contents and associated viscosities measured are listed in Table 2.

TABLE 2

Influence of the moisture content of the composition on the viscosity of the hot melt

| Composition (parts by weight) | | | | |
|---|---|---|---|---|
| Urea | Starch product | Water | Viscosity (mPa · s) | Temperature (°C.) |
| 50.0 | 36.95 | 13.05 | 1940 | 120 |
| 50.0 | 43.9 | 6.1 | 5375 | 120 |
| 50.0 | 46.25 | 3.75 | 5750 | 120 |

EXAMPLE 3

A series of hot melts was made, using equal amounts of starch product (oxidized starch of Example 1) and urea. The results are listed in Table 3.

TABLE 3

Influence of the holt-melt adhesive composition on the hot melt viscosity

| Composition (parts by weight) | | | | |
|---|---|---|---|---|
| Urea | Starch product | Water | Viscosity (mPa · s) | Temperature (°C.) |
| 42.5 | 42.5 | 15.0 | 5250 | 120 |
| 46.75 | 46.75 | 6.5 | 5375 | 120 |
| 48.05 | 48.25 | 3.9 | 9000 | 120 |

EXAMPLE 4

The oxidized starch from Example 1 was mixed with urea in different ratios. The viscosities of the hot melt are listed in Table 4.

TABLE 4

Influence of the mixing ratio on the hot melt viscosity

| Composition (parts by weight) | | | | |
|---|---|---|---|---|
| Urea | Starch product | Water | Viscosity (mPa · s) | Temperature (°C.) |
| 40.0 | 49.8 | 10.2 | >12,500 | — |
| 45.0 | 45.6 | 9.4 | 5250 | 120 |
| 50.0 | 41.5 | 8.5 | 5375 | 120 |
| 55.0 | 37.3 | 7.7 | 9000 | 120 |
| 60.0 | 33.2 | 6.8 | 1500 | 120 |

EXAMPLE 5

Oxidized (DS carboxyl groups 0.016) and hydroxypropylated (DS hydroxypropyl groups 0.29) maize starch having a moisture content of 8.4% were mixed 1:1 with urea. The resulting composition contained 45.8 parts by weight of starch, 50.0 parts by weight of urea and 4.2 parts by weight of moisture. The mixture was heated to 130° C. with regular agitation. A fluid glue was formed having a viscosity of 4190 mPa.s.

EXAMPLE 6

Of a yellow potato starch dextrin having a moisture content of 10.4% and a DE (dextrose equivalent) of 3.3, 15 g were mixed with 5 g urea. The resulting composition contained 67.2 parts by weight of starch, 25 parts by weight of urea and 7.8 parts by weight of moisture. The mixture was heated to 130° C. A fluid hot melt was formed having a viscosity of 3750 mPa.s., using spindle 29.

We claim:

1. A process for preparing a hot-melt adhesive composition comprising:

mixing a starch product and urea with each other to obtain a homogenous composition, in a starch product/urea weight ratio being selected within a range of 3/1–3/97 to provide a starch product plus urea amount, and a moisture content of 3–20 wt. % based on said amount of said starch product plus urea, whereby the amount of said moisture is smaller than the amount of said urea and whereby swelling of the starch product remains restricted due to said moisture content, and wherein said mixing is conducted in the absence of oxidative treatment.

2. The process according to claim 1, wherein said starch product/urea weight ratio is a starch product/urea weight ratio selected within a range of 7/4–3/7.

3. The process according to claim 1, further comprising heating during said mixing.

4. The process according to claim 1, wherein said homogenous composition is a homogenous composition having a melting temperature which ranges from 90° C. to 150° C.

5. The process according to claim 4, wherein said homogenous composition has a melting temperature which ranges from 100° C. to 140° C.

6. The process according to claim 1, wherein said homogenous composition in a molten state has a viscosity from 1000 mPa.s. to 20,000 mPa.s.

7. The process according to claim 1, wherein said starch product is a partially hydrolyzed modified starch.

8. The process according to claim 1, wherein said starch product is an oxidized starch.

9. The process according to claim 1, further comprising optionally adding water to obtain said moisture content of 3–20 wt. % based on said amount of said starch product plus urea.

10. A hot-melt adhesive composition comprising a homogenous combination of a starch product, urea and water, with a starch product/urea weight ratio being within a range of 3/1–3/97 to provide a starch product plus urea amount, and said water being present in an amount sufficient to provide a moisture content of 3–20 wt. % based on said starch product plus urea amount, wherein the amount of said water is smaller than the amount of said urea and whereby swelling of said starch product remains restricted due to said moisture content.

11. An article of manufacture which includes a hot-melt adhesive comprising a homogenous combination of a starch product, urea and water, with a starch product/urea weight ratio being within a range of 3/1–3/97 to provide a starch product plus urea amount, and said water being present in an amount sufficient to provide a moisture content of 3–20 wt. % based on said starch product plus urea amount, wherein the amount of said water is smaller than the amount of said urea and whereby swelling of said starch product remains restricted due to said moisture content.

12. The article of manufacture of claim 10 which is packaging material.

13. The article of manufacture of claim 10 which is a nonwoven article.

* * * * *

UNITED STATES PATENT AND TRADEMARK OFFICE
CERTIFICATE OF CORRECTION

PATENT NO. : 5,454,862
DATED : October 3, 1995
INVENTOR(S) : Jansen, et al.

It is certified that error appears in the above-indentified patent and that said Letters Patent is hereby corrected as shown below:

On the title page, item [73] Assignee

Coöperatieve Verkoop- en Productievereneniging van Aardappelmeel en Derivaten AVEBE B.A.

Signed and Sealed this

Sixteenth Day of July, 1996

Attest:

BRUCE LEHMAN

*Attesting Officer*  *Commissioner of Patents and Trademarks*